(12) United States Patent
Lee et al.

(10) Patent No.: US 8,570,461 B2
(45) Date of Patent: Oct. 29, 2013

(54) POLYMER-DISPERSED LIQUID CRYSTAL DISPLAY DEVICE AND METHOD OF MANUFACTURING THE SAME

(75) Inventors: Gae-hwang Lee, Hwaseong-si (KR); Jae-eun Jang, Seoul (KR); Jae-eun Jung, Seoul (KR); Kyu-young Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 185 days.

(21) Appl. No.: 12/923,374

(22) Filed: Sep. 17, 2010

(65) Prior Publication Data
US 2011/0134372 A1   Jun. 9, 2011

(30) Foreign Application Priority Data
Dec. 8, 2009   (KR) .................. 10-2009-0121402

(51) Int. Cl.
*G02F 1/1333*   (2006.01)

(52) U.S. Cl.
USPC ............. 349/93; 349/86; 349/89; 349/90

(58) Field of Classification Search
USPC ............................................ 349/86
See application file for complete search history.

(56) References Cited

U.S. PATENT DOCUMENTS 5,096,282 A * 3/1992 Margerum et al. ............. 359/3
2007/0139586 A1 * 6/2007 Gu et al. ...................... 349/88

FOREIGN PATENT DOCUMENTS

| JP | 05-281519 | 10/1993 |
|---|---|---|
| JP | 06-102493 | 4/1994 |
| JP | 08-190084 | 7/1996 |
| JP | 2001-091930 | 4/2001 |

* cited by examiner

*Primary Examiner* — Phu Vu
(74) *Attorney, Agent, or Firm* — Harness, Dickey & Pierce

(57) ABSTRACT

Provided are a polymer-dispersed liquid crystal (PDLC) display device and a method of manufacturing the same. The PDLC display device may include a PDLC layer between facing substrates, wherein the PDLC layer has at least two regions including polymers having different concentrations.

18 Claims, 6 Drawing Sheets

POLYMER-DISPERSED LIQUID CRYSTAL DISPLAY DEVICE AND METHOD OF MANUFACTURING THE SAME

CROSS-REFERENCE TO RELATED APPLICATIONS

This application claims priority under U.S.C. §119 to Korean Patent Application No. 10-2009-0121402, filed on Dec. 8, 2009, in the Korean Intellectual Property Office, the entire contents of which are incorporated herein by reference.

BACKGROUND

1. Field

Example embodiments relate to polymer-dispersed liquid crystal (PDLC) display devices and methods of manufacturing the same.

2. Description of the Related Art

A polymer-dispersed liquid crystal (PDLC) display device may be a display device which scatters light or transmits light by changing the refractive indices of polymers and liquid crystals through the application of an electric field to a PDLC layer in which the polymers and the liquid crystals are uniformly mixed. The PDLC display device may transmit light therethrough or may block light by using an electric field, instead of using an alignment layer and a polarization plate. In the PDLC display device, cured polymers adhere to a substrate to enable bending of the PDLC display device. In this regard, the PDLC display device may be more favorable for the implementation of a flexible display device than other LCD devices.

SUMMARY

Example embodiments provide polymer-dispersed liquid crystal (PDLC) display devices and methods of manufacturing the same. Additional aspects will be set forth in part in the description which follows and, in part, will be apparent from the description, or may be learned by practice of example embodiments.

According to example embodiments, a polymer-dispersed liquid crystal (PDLC) display device may include a first substrate and a second substrate configured to face each other, a first electrode and a second electrode on the first substrate and the second substrate, respectively and a PDLC layer between the first electrode and the second electrode, the PDLC layer including at least two regions containing polymers having different concentrations.

The PDLC layer may further include liquid crystals. The at least two regions containing the polymers having different concentrations may be provided alternately and repetitively. The at least two regions may include a region containing polymers with a lower concentration and a region containing polymers with a higher concentration, and the region containing polymers with a lower concentration may correspond with an effective display region of a pixel and the region containing polymers with a higher concentration may correspond with a non-display region of the pixel.

According to example embodiments, a method of manufacturing a polymer-dispersed liquid crystal (PDLC) display device may include injecting a mixture including a photocurable material between a first electrode and a second electrode configured to face each other, applying light to the mixture through a photomask including patterns having different light transmittances and forming a PDLC layer including polymers by absorbing the light into the photocurable material, the PDLC layer including at least two regions containing polymers having different concentrations.

The mixture may further include liquid crystals. The method may further include applying light to the mixture after removing the photo-mask. A concentration of the polymers in a region of the at least two regions of the PDLC layer may be higher than a concentration of the photocurable material in the mixture. A concentration of the polymers in another region of the at least two regions of the PDLC layer may be lower than a concentration of the photocurable material in the mixture. The at least two regions containing the polymers having different concentrations may be formed alternately and repetitively.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
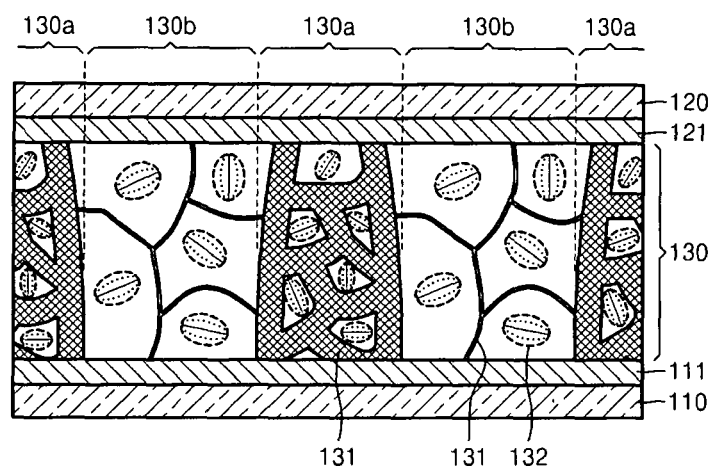
FIG. 1 is a cross-sectional view schematically illustrating a polymer-dispersed liquid crystal (PDLC) display device according to example embodiments.

Reference will now be made in detail to example embodiments, examples of which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description. In the drawings, the thicknesses of layers and regions are exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a cross-sectional view schematically illustrating a polymer-dispersed liquid crystal (PDLC) display device according to example embodiments. Like a conventional display device, the PDLC display device according to example embodiments may include a plurality of pixels that are the basic units of image display. However, in FIG. 1, some of the plurality of pixels are illustrated for convenience sake. Each of the pixels may have blue, green, and red sub-pixels to express a color.

Referring to FIG. 1, the PDLC display device may include a first substrate 110 and a second substrate 120 which are spaced apart from each other and face each other, a first electrode 111 and a second electrode 121 formed on the first substrate 110 and the second substrate 120, respectively, and a PDLC layer 130 formed between the first electrode 111 and the second electrode 121.

The first substrate 110 and the second substrate 120 may be transparent substrates. The first substrate 110 and the second substrate 120 may be, but are not limited to, flexible. The first substrate 110 and the second substrate 120 may be made of, without being limited to, glass or plastic, or other materials. The first electrode 111 may be formed on a top surface of the first substrate 110, and the second electrode 121 may be formed on a bottom surface of the second substrate 120. The first electrode 111 and the second electrode 121 may be made of, for example, a transparent conductive material, e.g., Indium Tin Oxide (ITO). In a passive matrix (PM) driving scheme, the first electrodes 111 may be formed in parallel in a stripe form and the second electrodes 121 may be formed in parallel in a stripe form to intersect the first electrodes 111. In an active matrix (AM) driving scheme, the first electrodes 111 (or the second electrodes 121) may be integrated to form a common electrode and the second electrode 121 (or the first electrode 111) may be formed to have a shape corresponding to sub-pixels.

Although not shown in FIG. 1, thin film transistors (TFTs) and driving electrodes may be formed on the first substrate 110, together with the first electrode 111. Between the first substrate 110 and the second substrate 120 may be provided barrier ribs (not shown) that separate the PDLC layers 130 of different colors to prevent or reduce color mixing. A reflective layer (not shown) may be further formed on a bottom surface of the first substrate 110 to reflect incident light.

The PDLC layer 130 may include polymers 131 and liquid crystals 132 included in the polymers 131. The PDLC layer 130 may further include dichroic dye (not shown). When the dichroic dye is mixed with the PDLC layer 130, the dichroic dye may be aligned or randomly distributed under the influence of movement of the liquid crystals 132, resulting in an optical change. The PDLC layer 130 may be formed by mixing a photocurable material with liquid crystals and curing this mixture with light, e.g., ultraviolet (UV) light. The photocurable material refers to light curing material. The photocurable material may be at least one of a monomer, an oligomer, and a polymer.

In example embodiments, the PDLC layer 130 may include at least two regions where the polymers 131 have different concentrations, e.g., weight percents, that is, a high-concentration region 130a where the concentration of the polymers 131 is higher and a low-concentration region 130b in which the concentration of the polymers 131 is lower. Generally, in a PDLC layer, the concentration of polymers for satisfying optical characteristics may be from about 5 to about 25 weight percent (wt %). However, in a PDLC display device including the polymers having those specified concentrations, an adhesive strength between the polymers and substrates may be lower, whereby the substrates and the PDLC layer may be separated from each other by repetitive bending of the PDLC display device. The separation between the PDLC layer and the substrates may be overcome by increasing the concentration of the polymers included in the PDLC layer, thereby degrading the optical characteristics of the PDLC layer.

However, as in example embodiments, by forming the regions 130a and 130b where the polymers 131 have different concentrations in the PDLC layer 130, the PDLC layer 130 may have improved optical characteristics and bending durability. For example, the high-concentration region 130a and the low-concentration region 130b may be formed in the PDLC layer 130. The low-concentration region 130b corresponds to an effective display region necessary for actual screen display among pixels, for example, sub-pixels. Therefore, optical characteristics are of importance in the low-concentration region 130b, and the concentration of the polymers 131 may be adjusted to optimize or improve the optical characteristics.

For example, the concentration of the polymers 131 in the low-concentration region 130b may be, for example, but not limited to, about 5-25 wt %. The high-concentration region 130a corresponds to a non-display region remaining after excluding the effective display region. In regards to the high-concentration region 130a, satisfying optical characteristics may not be an issue. Consequently, by sufficiently increasing the concentration of the polymers 131, an adhesive strength between the first substrate 110 and the second substrate 120, and the PDLC layer 130 may be locally improved. For example, the concentration of the polymers 131 in the high-concentration region 130a may be, for example, but not limited to, about 25 wt % or higher.

The high-concentration region 130a and the low-concentration region 130b may be formed alternately and repetitively in the PDLC layer 130. Although it has been described above that the two regions 130a and 130b where the polymers 131 have different concentrations are formed in the PDLC layer 130, three or more regions where the polymers 131 have different concentrations may be formed in the PDLC layer 130.

Figure 2:
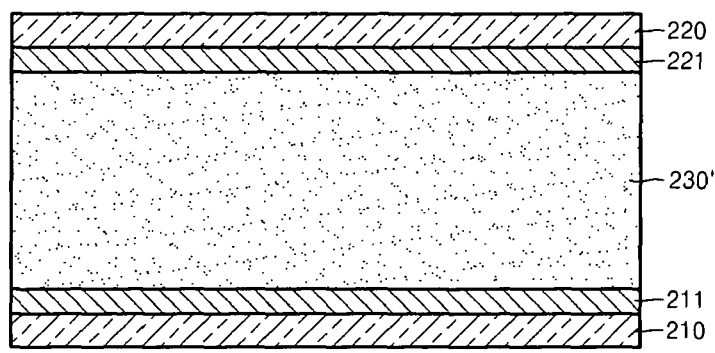
FIGS. 2 through 4 are views for explaining a method of manufacturing a PDLC display device, according to example embodiments.
Figure 3:
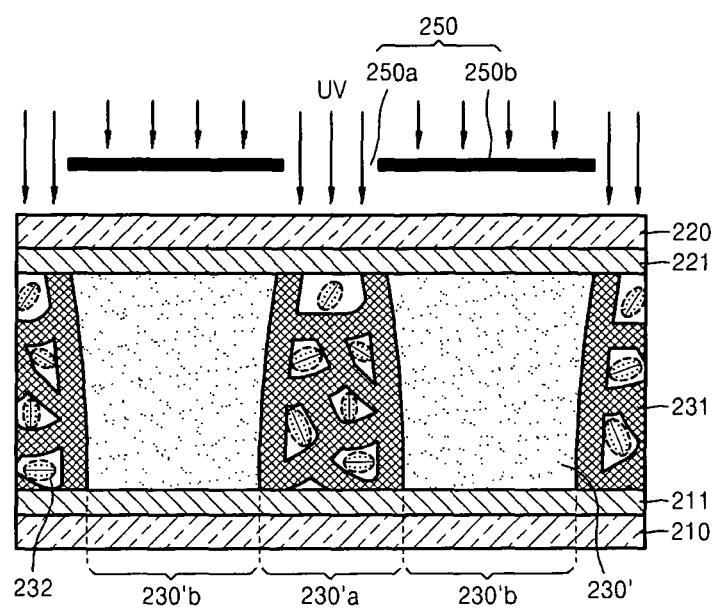
Figure 4:
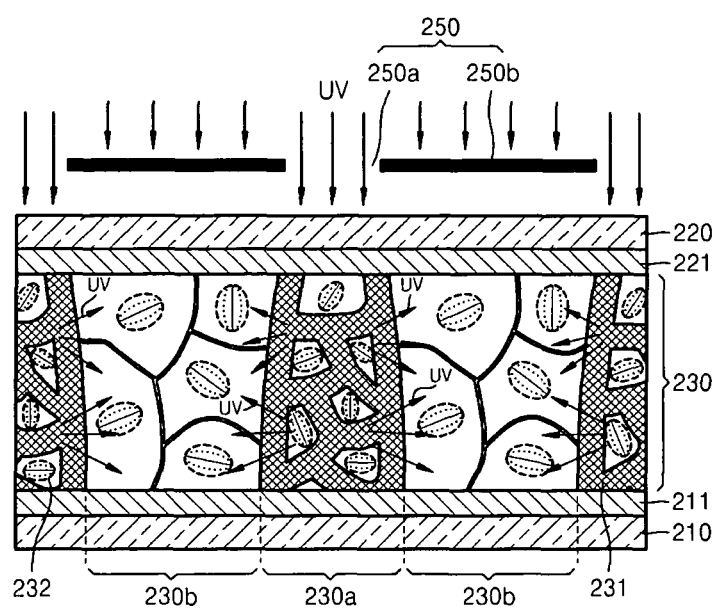

FIGS. 2 through 4 are views for explaining a method of manufacturing a PDLC display device, according to example embodiments. Referring to FIG. 2, a first electrode 211 and a second electrode 221 may be disposed to face each other. The first electrode 211 and the second electrode 221 may be made of a transparent conductive material. For example, the first electrode 211 and the second electrode 221 may be made of, without being limited to, ITO, or other materials. The first electrode 211 and the second electrode 221 may be formed on a first substrate 210, which is an upper substrate, and a second substrate 220, which is a lower substrate, respectively. The first substrate 210 and the second substrate 220 may be transparent substrates, for example, a glass substrate or a plastic substrate. Although not shown in the FIGS. 2 through 4, TFTs and driving electrodes may be formed on the first substrate 210, together with the first electrode 211.

A mixture 230' may be injected between the first electrode 211 and the second electrode 221. In example embodiments, liquid crystals and a photocurable material may be mixed to form the mixture 230'. The photocurable material refers to light curing material. The photocurable material may be at least one of a monomer, an oligomer, and a polymer. The mixture 230' may further include dichroic dye, a photo-polymerizing agent, and/or a cross-linking agent. The dichroic dye may have various colors, for example, but not limited to, black, yellow, magenta, red, green, and/or blue.

Referring to FIG. 3, a photo-mask 250 may be provided in which a light-transmitting pattern 250a and a light-blocking pattern 250b may be formed with different transmittances according to positions on the second substrate 220, and UV light may be applied to the mixture 230' through the photo-mask 250. The photo-mask 250 may include, for example, the light-transmitting pattern 250a having a light transmittance of 100% and the light-blocking pattern 250b having a light transmittance of 0%. Once the UV light is applied to the mixture 230', the photocurable material in the mixture 230' may be turned into polymers 231.

In detail, upon application of the UV light to the mixture 230', a curing reaction of the photocurable material rapidly occurs in a light-transmitting region 230'a of the mixture 230' corresponding to the light-transmitting pattern 250a, and the photocurable material present in a light-blocking region 230'b around the light-transmitting region 230'a moves to the light-transmitting region 230'a. Thus, the photocurable material may be turned into polymers 231. As a result, the concentration of the photocurable material in the light-blocking region 230'b may be lowered.

The UV light incident to the light-transmitting region 230'a may be scattered by the polymers 231 and liquid crystals 232 formed in the light-transmitting region 230'a, as shown in FIG. 4, and the scattered UV light cures the photocurable material present in the light-blocking region 230'b of the mixture 230', thus forming a PDLC layer 230 between the first electrode 211 and the second electrode 221. After the application of the UV light to the mixture 230' through the photo-mask 250, the photo-mask 250 may be removed and then UV light may be further applied to the mixture 230'.

A high concentration region 230a where the concentration of the polymers 231 is high and a low-concentration region 230b where the concentration of the polymers 231 is low may be formed in the PDLC layer 230. The high-concentration region 230a may be formed by curing the light-transmitting region 230'a of the mixture 230'. The concentration of the polymers 231 in the high-concentration region 230a may be higher than that of the photocurable material in the initial mixture 230'. The high-concentration region 230a corresponds to a non-display region as described above.

Through the high-concentration region 230a, an adhesive strength between the polymers 231, and the first substrate 210 and the second substrate 220 can be increased. The low-concentration region 230b may be formed by curing the light-blocking region 230'b of the mixture 230'. The low-concentration region 230b corresponds to an effective display region as described above. Consequently, the concentration of the polymers 231 in the low-concentration region 230b may be adjusted to be optimal to satisfy necessary optical characteristics.

The concentration of the polymers 231 in the low-concentration region 230b may be lower than that of the photocurable material in the initial mixture 230'. That is, both the effective display region having improved optical characteristics and the non-display region having stronger adhesive strength can be formed when the concentration of the photocurable material in the initial mixture 230' is higher than that of the polymers 231 necessary to satisfy the optical characteristics of the PDLC layer 230.

Figure 5A:
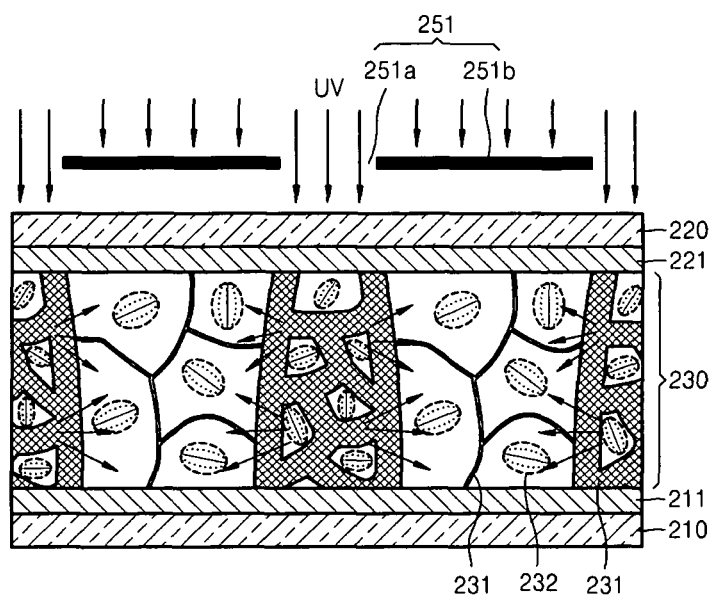
FIGS. 5A through 5C illustrate photo-masks used in a method of manufacturing a PDLC display device, according to example embodiments.
Figure 5B:
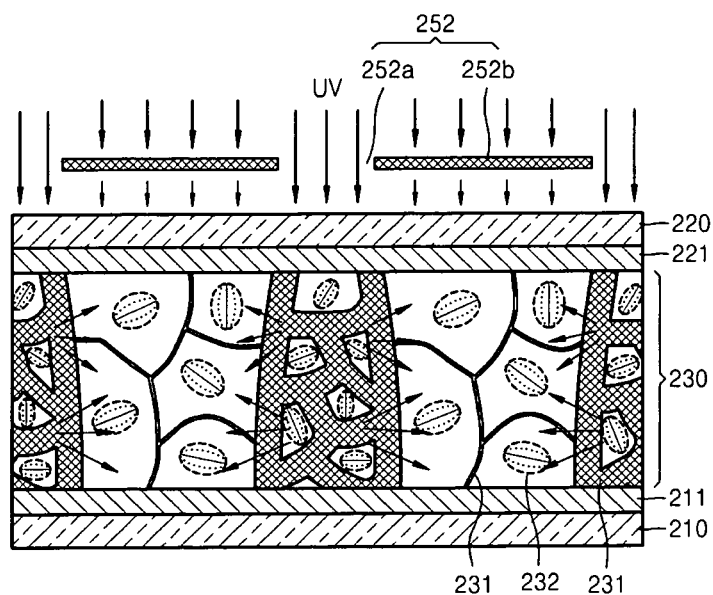
Figure 5C:
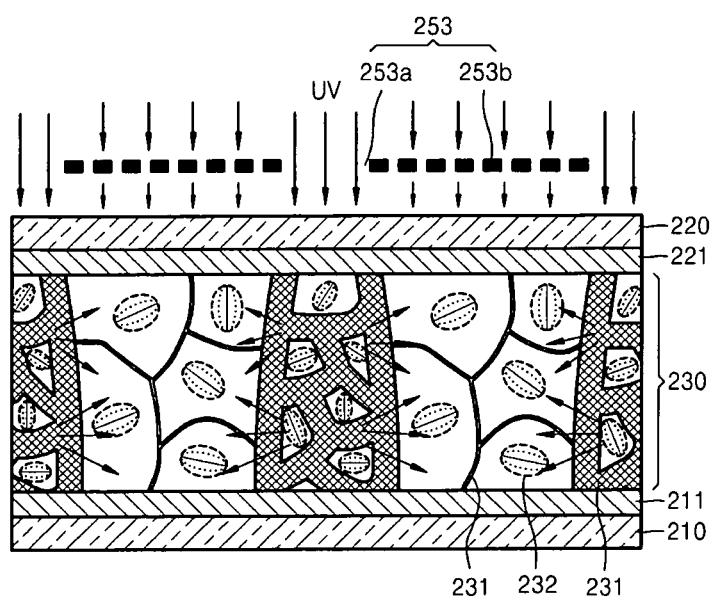

The transmittances of the light-transmitting pattern 250a and the light-blocking pattern 250b of the photo-mask 250 used in example embodiments may be adjusted variously according to the material or pattern shape of the photo-mask 250. FIGS. 5A through 5C illustrate photo-masks used in a method of manufacturing a PDLC display device, according to example embodiments.

Referring to FIG. 5A, a photo-mask 251 may include a light-transmitting pattern 251a having a light transmittance of 100% and a light-blocking pattern 251b having a light transmittance of 0%. The photo-mask 251 may be formed of, for example, metal. Referring to FIG. 5B, a photo-mask 252 may include a light-transmitting pattern 252a having a light transmittance of 100% and a partial light-transmitting pattern 252b having a light transmittance being less than 100%. The photo-mask 252 may be made of, for example, metal oxide. If metal oxide is formed by oxidizing metal having a light absorption of 100%, a portion of the light may be transmitted through the metal oxide. The light transmittance of the partial light-transmitting pattern 252b of the photo-mask 252 can be adjusted by changing the type of metal to be oxidized.

Referring to FIG. 5C, a photo-mask 253 may include a light-transmitting pattern 253a having a light transmittance of 100% and a partial light-transmitting pattern 253b having a light transmittance being less than 100%. The photo-mask 253 may be made of metal or metal oxide where a plurality of through-holes are formed. By adjusting the size and number of through-holes, the light transmittance of the partial light-transmitting pattern 253b of the photo-mask 253 can be adjusted.

As described above, by forming different regions where polymers have different concentrations in a PDLC layer, a flexible PDLC display device may be implemented with improved optical characteristics and bending durability.

It should be understood that example embodiments described therein should be considered in a descriptive sense only and not for purposes of limitation. Descriptions of features or aspects within each embodiment should typically be considered as available for other similar features or aspects in other example embodiments.

What is claimed is:

1. A polymer-dispersed liquid crystal (PDLC) display device comprising:
    a first substrate and a second substrate configured to face each other;
    a first electrode and a second electrode on the first substrate and the second substrate, respectively; and
    a PDLC layer between the first electrode and the second electrode, the PDLC layer including at least one first region containing polymers in a concentration of about 5-25 wt % and at least one second region containing the polymers in a concentration higher than the concentration of the at least one first region,
    wherein each of the at least one first region and the at least one second region extend from an upper surface of the first electrode to a lower surface of the second electrode.

2. The PDLC display device of claim 1, wherein the PDLC layer further comprises liquid crystals.

3. The PDLC display device of claim 1, wherein the at least one first and second regions are provided alternately and repetitively.

4. The PDLC display device of claim 1, wherein
    the at least one first region containing the polymers in the concentration of about 5-25 wt % corresponds with an effective display region of a pixel and the at least one second region corresponds with a non-display region of the pixel.

5. A method of manufacturing a polymer-dispersed liquid crystal (PDLC) display device, the method comprising:
    injecting a mixture including a photocurable material between a first electrode and a second electrode configured to face each other;
    applying light to the mixture through a photomask including patterns having different light transmittances; and
    forming a PDLC layer including polymers by absorbing the light into the photocurable material, the PDLC layer including at least one first region containing polymers in a concentration of about 5-25 wt % and at least one second region containing the polymers in a concentration higher than the concentration of the at one first region,
    wherein the at least one first and second regions are provided alternately and repetitively, and
    wherein each of the at least one first region and the at least one second region extend from an upper surface of the first electrode to a lower surface of the second electrode.

6. The method of claim 5, wherein the mixture further comprises liquid crystals.

7. The method of claim 5, further comprising:
    applying light to the mixture after removing the photo-mask.

8. The method of claim 5, wherein the concentration of the polymers in the at least one second region of the PDLC layer is higher than a concentration of the photocurable material in the mixture.

9. The method of claim 5, wherein the concentration of the polymers in the at least one first region of the PDLC layer is lower than a concentration of the photocurable material in the mixture.

10. The PDLC display device of claim 2, wherein the liquid crystals are present in the at least one first and second regions.

11. The method of claim 6, wherein the liquid crystals are present in the at least one first and second regions.

12. The PDLC display device of claim 1, wherein the concentration of the at least one second region is about 25 wt % or higher.

13. The method of claim 5, wherein the concentration of the at least one second region is about 25 wt % or higher.

14. The method of claim 5, wherein the at least one first region containing the polymers in the concentration of about 5-25 wt % corresponds with an effective display region of a pixel.

15. The polymer-dispersed liquid crystal (PDLC) display device of claim 1, wherein the at least one first region has a first thickness extending in a first direction and the at least one second region has a second thickness extending in the first direction, the second thickness being greater than the first thickness.

16. The polymer-dispersed liquid crystal (PDLC) display device of claim 1, wherein a portion of the at least one first region contacting the second electrode is less than a portion contacting the first electrode and a portion of the at least one second region contacting the second electrode is greater than a portion contacting the first electrode.

17. The method of claim 5, wherein the at least one first region has a first thickness extending in a first direction and the at least one second region has a second thickness extending in the first direction, the second thickness being greater than the first thickness.

18. The method of claim 5, wherein a portion of the at least one first region contacting the second electrode is less than a portion contacting the first electrode and a portion of the at least one second region contacting the second electrode is greater than a portion contacting the first electrode.

* * * * *